(12) United States Patent
Glazemakers et al.

(10) Patent No.: US 11,206,243 B2
(45) Date of Patent: Dec. 21, 2021

(54) MULTIPLE GATEWAY CONTROLLERS TO ESTABLISH NETWORK ACCESS

(71) Applicant: Cyxtera Cybersecurity, Inc., Coral Gables, FL (US)

(72) Inventors: Kurt Glazemakers, Grembergen (BE); Gokhan Berberoglu, Gothenburg (SE); Kosmas Valianos, Ojersjo (SE); Per Johan Allansson, Kungsbacka (SE); Hoang Long Nguyen, Gothenburg (SE); Thomas Bruno Emmanuel Cellerier, Kungalv (SE); Aitor Perez Iturri, Gothenburg (SE); Harish Dinne, Gothenburg (SE); Salvatore Tomaselli, Gothenburg (SE)

(73) Assignee: Cyxtera Cybersecurity, Inc., Coral Gables, FL (US)

( * ) Notice: Subject to any disclaimer, the term of this patent is extended or adjusted under 35 U.S.C. 154(b) by 126 days.

(21) Appl. No.: 16/805,360

(22) Filed: Feb. 28, 2020

(65) Prior Publication Data
US 2020/0287749 A1 Sep. 10, 2020

Related U.S. Application Data

(60) Provisional application No. 62/813,610, filed on Mar. 4, 2019.

(51) Int. Cl.
*H04L 29/06* (2006.01)
*H04L 12/46* (2006.01)
(Continued)

(52) U.S. Cl.
CPC ........ *H04L 63/029* (2013.01); *H04L 12/4633* (2013.01); *H04L 12/4641* (2013.01);
(Continued)

(58) Field of Classification Search
CPC ....... H04L 29/06; H04L 63/029; H04L 45/74; H04L 12/4633; H04L 45/54; H04L 12/66;
(Continued)

(56) References Cited

U.S. PATENT DOCUMENTS 8,498,295 B1 7/2013 Saxena et al.
9,560,015 B1 1/2017 Glazemakers et al.
(Continued)

OTHER PUBLICATIONS

Network Access Controller Operation, U.S. Appl. No. 16/805,348, Kurt Glazemakers et al., Application Undergoing Preexam Processing, Feb. 28, 2020.
(Continued)

*Primary Examiner* — Frank Duong
(74) *Attorney, Agent, or Firm* — Greenberg Traurig

(57) ABSTRACT

Network access is provided to a networking device. In one approach, a method includes: obtaining, by a gateway, access rules for a networking device; providing, by the gateway, one or more dedicated networking tunnels between the gateway and respective remote gateways to one or more respective network segments, wherein the networking device is authorized to access the one or more network segments by the access rules; and routing, by the gateway, networking packets from the networking device based on source address information in the networking packets to the one or more dedicated networking tunnels, and based on destination address information in the networking packets, routing the networking packets to a selection of the one or more dedicated networking tunnels.

20 Claims, 9 Drawing Sheets

(51) Int. Cl.
*H04L 12/741* (2013.01)
*H04L 12/66* (2006.01)
*H04W 76/12* (2018.01)
*H04W 48/16* (2009.01)
*H04W 48/18* (2009.01)
*H04W 88/16* (2009.01)

(52) U.S. Cl.
CPC .............. *H04L 12/66* (2013.01); *H04L 45/54* (2013.01); *H04L 45/74* (2013.01); *H04L 63/0272* (2013.01); *H04L 63/08* (2013.01); *H04L 63/10* (2013.01); *H04W 48/16* (2013.01); *H04W 48/18* (2013.01); *H04W 76/12* (2018.02); *H04W 88/16* (2013.01)

(58) Field of Classification Search
CPC ..... H04L 63/10; H04L 63/08; H04L 63/0272; H04L 12/46; H04L 12/4641; H04L 63/0263; H04L 45/72; H04L 45/50; H04W 76/12; H04W 48/16; H04W 48/18; H04W 88/16
See application file for complete search history.

(56) References Cited

U.S. PATENT DOCUMENTS

| | | | |
|---|---|---|---|
| 9,628,444 | B1 | 4/2017 | Glazemakers et al. |
| 9,736,120 | B2 | 8/2017 | Glazemakers et al. |
| 9,853,947 | B2 | 12/2017 | Glazemakers et al. |
| 2009/0019521 | A1* | 1/2009 | Vasudevan .......... H04W 12/086 726/3 |
| 2015/0009831 | A1 | 1/2015 | Graf |
| 2015/0200852 | A1 | 7/2015 | Solis |
| 2015/0236965 | A1 | 8/2015 | Short et al. |
| 2016/0150043 | A1 | 5/2016 | Petronic et al. |
| 2017/0230333 | A1* | 8/2017 | Glazemakers .......... H04L 47/70 |
| 2017/0295140 | A1* | 10/2017 | Glazemakers ...... H04L 12/4633 |
| 2017/0373942 | A1 | 12/2017 | Ong |
| 2018/0041395 | A1 | 2/2018 | Short et al. |
| 2018/0041436 | A1 | 2/2018 | Zhang |
| 2018/0069826 | A1 | 3/2018 | Glazemakers et al. |
| 2018/0183763 | A1 | 6/2018 | Glazemakers et al. |
| 2020/0287750 | A1 | 9/2020 | Glazemakers et al. |
| 2020/0287869 | A1 | 9/2020 | Glazemakers et al. |
| 2020/0288386 | A1 | 9/2020 | Glazemakers et al. |

OTHER PUBLICATIONS

Management of Network Access Request Based on Source Address of Device, U.S. Appl. No. 16/805,368, Kurt Glazemakers et al., Application Undergoing Preexam Processing, Feb. 28, 2020.

Establishing Network Tunnel in Response to Access Request, U.S. Appl. No. 16/805,371, Kurt Glazemakers et al., Application Undergoing Preexam Processing, Feb. 28, 2020.

* cited by examiner

MULTIPLE GATEWAY CONTROLLERS TO ESTABLISH NETWORK ACCESS

RELATED APPLICATIONS

This application claims priority to U.S. Provisional Application Ser. No. 62/813,610, filed Mar. 4, 2019, entitled "PROVISIONING OF NETWORK ACCESS TO A COMMUNICATION DEVICE," by Glazemakers et al., the entire contents of which application is incorporated by reference as if fully set forth herein.

FIELD OF THE TECHNOLOGY

Various example embodiments relate to providing network access to a networking device.

BACKGROUND

When a networking device is plugged into a local network, it can, in principle, access all other communication devices within the local network. To access other networks, for example another subnet, network segment or the Internet, the communication device has to traverse gateway devices that connect the local network with the other networks.

Different measures exist to manage the network access of such a communication device (e.g., Network Access Control (NAC), Virtual Private Networking (VPN)), further subdividing the local network into different virtual networks, and incorporating firewalls into the routing and gateway logic.

SUMMARY

A problem with the above identified access mechanisms is that they rely heavily on the underlying network topology. Therefore, access rules for a device or corresponding user must be translated into the physical topology of the underlying network. For large enterprise networks, a newly-added communication device may trigger a change in firewall and networking rules in a multitude of networking devices before the communication can even access the network segments it is allowed access to. The other way around, a change in the network topology results in a reconfiguration of the networking devices in order to maintain the existing network security.

Example embodiments of the present disclosure foresee, amongst others, a solution to this identified problem.

According to a first example aspect, a method is provided comprising the following steps:
  obtaining, by a first gateway access rules for a first networking device (150);
  by the first gateway, providing one or more dedicated networking tunnels (120, 121, 122) between the first gateway and respective remote gateways (270, 280) to one or more respective network segments (271, 281); wherein the first networking device is authorized to access the one or more network segments by the access rules;
  by the first gateway, routing networking packets from the first networking device based on source address information in the networking packets to the one or more dedicated networking tunnels and, based on destination address information in the networking packets, routing the networking packets to a selection of the one or more dedicated networking tunnels.

In various embodiments, the first gateway, which acts as the default gateway for the networking device, only provides the networking device access beyond the local network by dedicated networking tunnels (e.g., for each connection with a certain network segment, a dedicated networking tunnel is created that is used only for network traffic between the networking device and the respective network segment). As the networking tunnels are dedicated, the gateway further performs a source based routing to forward packets from the networking device to the correct networking tunnel. This avoids having multiple routes to a certain segment by having different accessible tunnels.

By the above method, network access beyond the local network of the first networking device is defined by the access rules and implemented by the networking tunnels. The network access beyond the local network is thus independent from the underlying network topology.

Additionally, the access control does not require any intervention from the networking device (e.g., no special software is needed on the networking device). As a result, the networking device may also be a headless device such as a printer, telephone, projector or any IoT device.

According to an example embodiment, the providing the one or more dedicated networking tunnels further comprises providing a dedicated routing table for the first networking device for performing the routing the networking packets to a selection of the one or more dedicated networking tunnels.

According to an example embodiment, the setting up further comprises providing a dedicated network container for the networking device in the default gateway; and wherein the routing comprises forwarding the networking packets to the dedicated network container. The dedicated network container may then further comprise the dedicated routing table.

According to an example embodiment, the method further comprises:
  by the first gateway, receiving a request from the first networking device for a hardware address of a device associated with the network address of the first gateway;
  by the first gateway, determining from the access rules whether the first gateway is a default gateway for the first networking device;
  when the first gateway is the default gateway for the first networking device, providing by the first gateway the hardware address of the first gateway in response to the first networking device.

According to an example embodiment, the method further comprises:
  by the first networking device, upon receiving the hardware address of the first gateway, associating the network address of the first gateway with the hardware address of the first gateway.

According to an example embodiment, the method further comprises:
  by a second gateway with the same network address as the first gateway, receiving the request from the first networking device;
  by the second gateway, determining from stored access rules that the second gateway is not the default gateway for the first networking device and refraining from responding to the request.

According to an example embodiment, the method further comprises:
  by the second gateway, receiving a request to take over as default gateway for the first networking device instead of the first gateway;

by the second gateway, providing the hardware address of the second gateway to the first networking device.

According to an example embodiment, the method further comprises:

by the first networking device, upon receiving the hardware address of the second gateway, removing an association of the network address of the first gateway with the hardware address of the first gateway and associating the network address of the first gateway with the hardware address of the second gateway.

According to an example embodiment, the method further comprises:

receiving a network address request from the first networking device;

based on the request, determining the access rules of the first networking device;

providing the access rules to the first gateway.

According to an example embodiment, the network address request of the first networking device comprises a hardware address associated with the first networking device; and wherein the determining further comprises:

determining from the hardware address a device type of the first networking device;

determining the access rules based on the device type of the first networking device.

According to an example embodiment, the method further comprises:

deriving a device fingerprint for the first networking device from the network address request;

determining the access rules of the first networking device based on the device fingerprint.

According to an example embodiment, the method further comprises:

in response to the network address request, providing a network address of the first networking device and a network address of the first gateway to the networking device.

According to a second example aspect, a networking device is disclosed comprising means for performing the steps as performed by the first and/or second gateway according to the first example aspect.

According to another further example aspect, a computer program product is disclosed comprising computer-executable instructions for causing a networking device to perform the steps according to the first example aspect.

According to a further example aspect, a computer readable storage medium is disclosed comprising computer-executable instructions for performing the steps according to the first example aspect when the program is run on a computer.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure relates to network communication between networking devices. Network communication relates to the exchange of networking packets according to a network addressing scheme. To this respect, network communication refers to a communication scheme or protocol at the networking layer. Some examples are the Internet Protocol comprising the Internet Protocol version 4 or IPv4 and the Internet Protocol version 6 or IPv6. A networking device is typically assigned with a network address either statically or dynamically. When a networking packet is forwarded from a source networking device to a destination networking device, the packet is forwarded along a series of intermediated devices. A communication network may further comprise a gateway that connects the network with other communication networks or network segments, such as for example with the Internet, with another private network, or with another subnet. When network packets are forwarded along a communication network, they are further encapsulated in link layer packets for communication to the next networking node using physical or hardware addressing schemes. An example of such a link layer addressing scheme is specified in the IEEE 802 protocol which uses so-called media access control address, or shortly MAC addresses.

Figure 1:
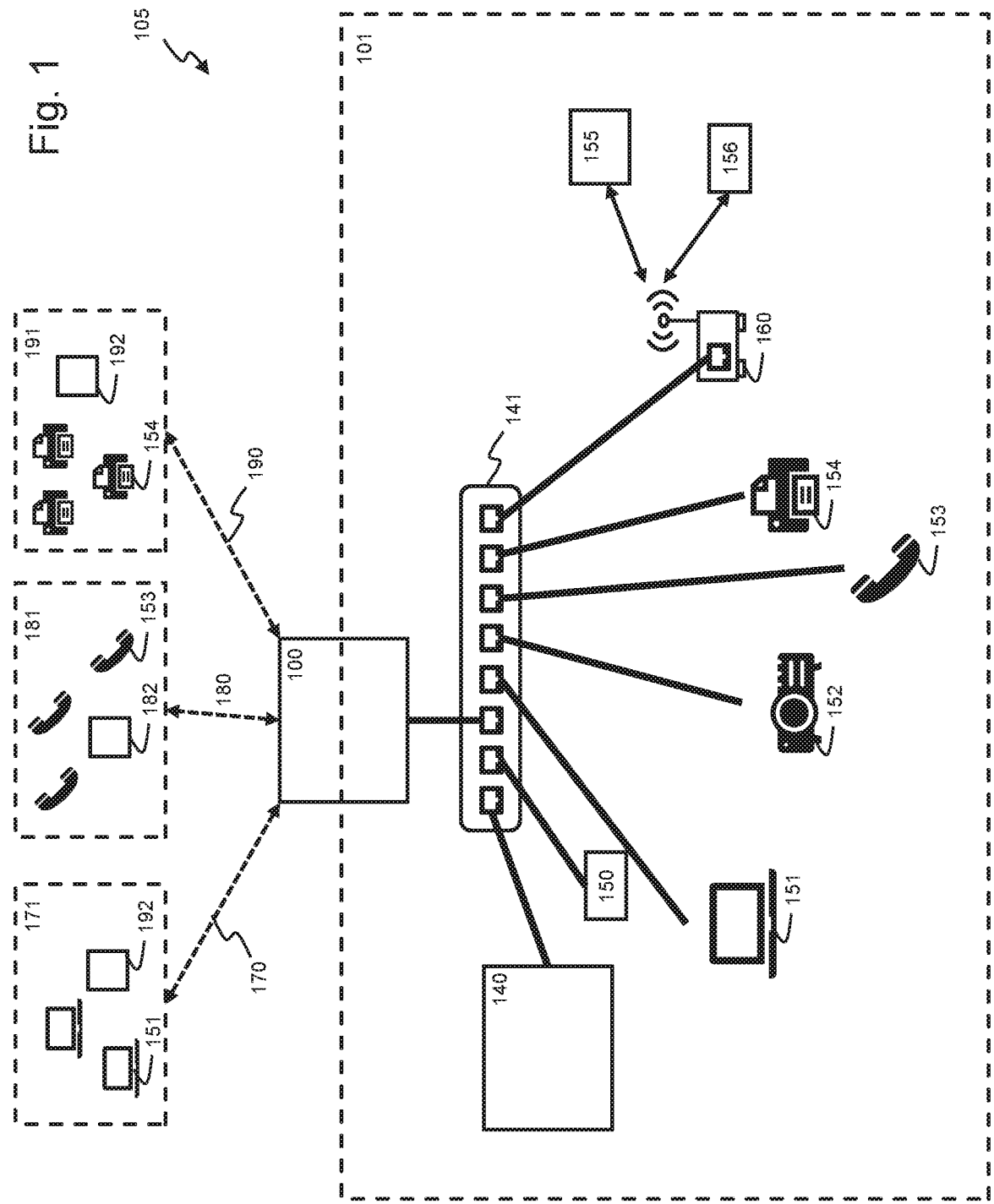
FIG. 1 shows an example embodiment of a secured communication network.

FIG. 1 illustrates an example of a secured segmented communication network 105 according to an embodiment. The security is provided by segment access controller 100, further referred to as access controller or AC. By access controller 100, network access by networking devices 150 to 156 to network segments 171, 181 and 191 is secured. To this purpose, access controller 100 establishes networking tunnels 170, 180, 190 to the different network segments 171, 181, 191.

More particularly, for each networking device 150 to 156 a dedicated distinct networking tunnel is established between the access controller 100 and the respective network segment thereby adding the respective networking devices to the network segments (e.g., making them accessible by devices in the respective segments and vice versa). Access controller 100 serves as the default gateway for the connected networking devices 151-156. This way, network traffic between a network segment and a respective networking device is then routed along such a dedicated tunnel. To this respect, access controller 100 maintains separate routing tables for each of the connected networking devices 151-156. By the secured communication network 105, networking devices may only communicate in an east-west fashion without control of the access controller 100, for example, within the boundaries of the local network segment 101, as defined by a network switch 141 by which the networking devices are connected. East-west data traffic may further be restricted by allowing networking devices 151-156 to only communicate with the networking port to which the access controller 100 is connected (e.g., by assigning the ports of the switch 141 to different virtual local area networks or VLANs).

Figure 2:
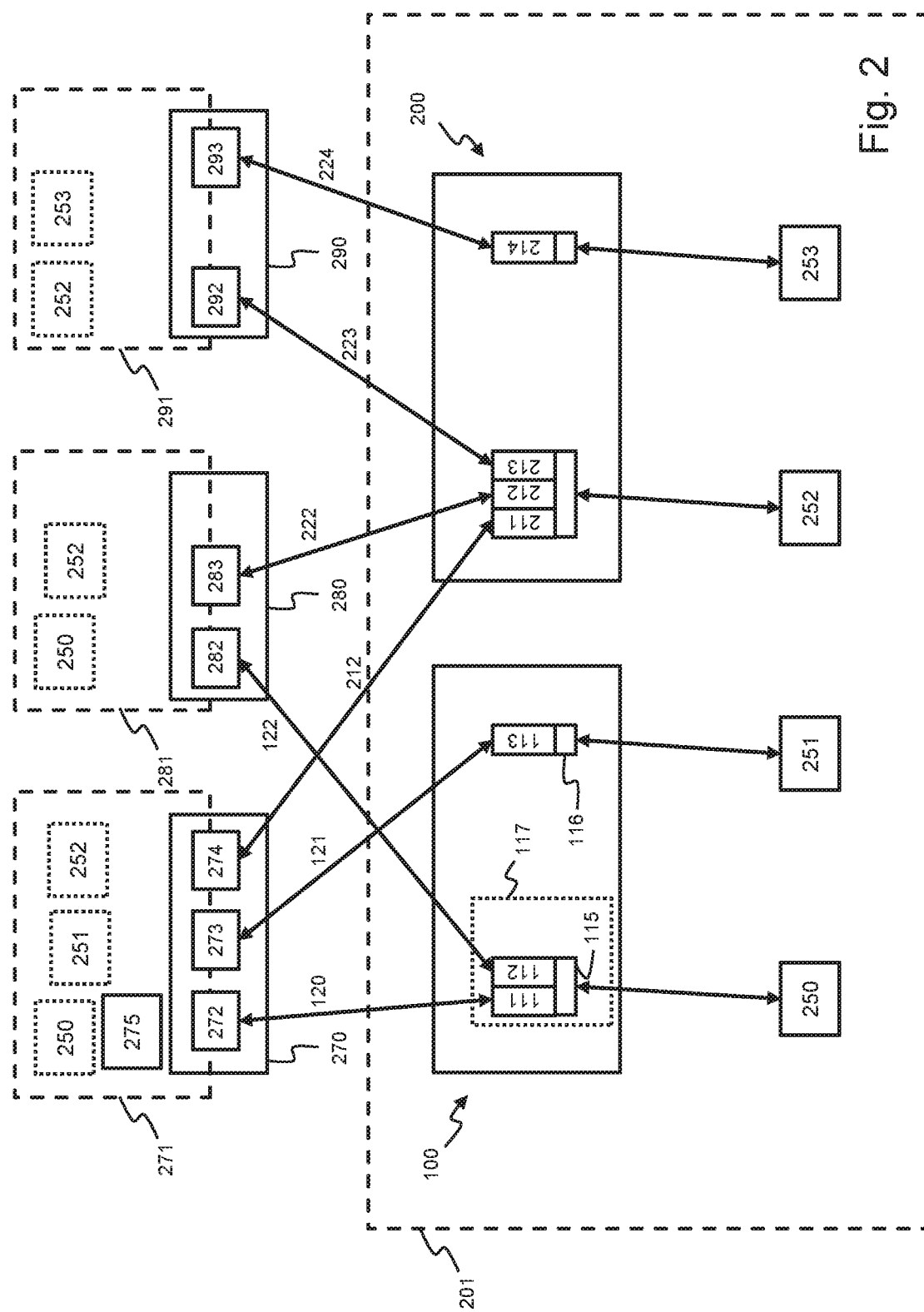
FIG. 2 shows another example embodiment of a secured communication network.

FIG. 2 illustrates a more general representation of the working principle of the access controller 100 of FIG. 1. In FIG. 2, networking devices 250 to 253 are used as an example of networking devices for which network control and access is to be provided by access controllers 100, 200 to the network segments 271, 281, 291. Each network segment 271, 281, 291 is accessible by at least one respective gateway 270, 280, 290. Networking device 250 is provided network access to network segments 271 and 281. This is done by a networking tunnel 120 between access controller 100 and gateway 270 and by a networking tunnel 122 between access controller 100 and gateway 280. By the tunnels 120 and 122, virtual networking interfaces 111 and 112 are present at the access controller 100 and virtual networking interfaces 272 and 282 are present at the respective gateways 270 and 280.

In a similar way: i) device 251 has network access to network segment 271 by the networking tunnel 121 between the interface 113 at the access controller 100 and the interface 273 and gateway 270; ii) device 253 has network access to network segment 291 by the networking tunnel 224 between the interface 214 at the access controller 200 and the interface 293 at the gateway 290; iii) device 252 has network access to network segment 291 by the networking tunnel 223 between the interface 213 at the access controller 200 and the interface 292 at the gateway 290, and has network access to network segment 281 by the networking tunnel 222 between the interface 212 at the access controller 200 and the interface 283 at the gateway 280, and has network access to network segment 271 by the networking tunnel 212 between the interface 211 at the access controller 200 and the interface 274 at the gateway 270.

In order to correctly route packets from the devices 250-253 to the network segments 271, 281, 291, the access controllers 100, 200 perform source based routing. For example, when a network packet arrives at access controller 100, it first checks the source address of the packet to decide to which set of networking tunnels the packet should be forwarded (e.g., to interface 115 or 116). Thereafter, the access controller 100 performs destination based routing to forward the packet to the correct networking tunnel.

The other way around, networking devices within one of the segments may establish a connection with a networking device 250-253 when the networking device is present in the respective segment. For example, a networking device 275 may establish a network connection with any one of networking devices 250 to 252. For example, when networking device 275 establishes a connection with networking device 250, it sends a packet to gateway 270. Gateway 270 on its turn routes the packet by interface 272, over tunnel 120 to interface 111. As interface 111 is dedicated to networking device 250, the packet is forwarded further by access controller 100 to networking device 250.

By the network layout according to FIGS. 1 and 2, any networking device that connects to a local network 201 can be provided access to any network segment in a safe and secure manner. Because of the dedicated tunnels, any network access of the networking devices outside the local network 201 is managed by the access controllers 100, 200. In other words, there is no need to protect the network infrastructure beyond the 1-hop boundary of the networking devices 250-253 (e.g., beyond the switching logic that connects the networking devices with the access controllers 100, 200).

FIGS. 3 to 8 show different sequence diagrams illustrating the establishing and maintaining of the segmented network layout as illustrated by FIG. 1 and FIG. 2. For sake of clarity, further reference is made to the networking components of FIG. 2.

Figure 3:
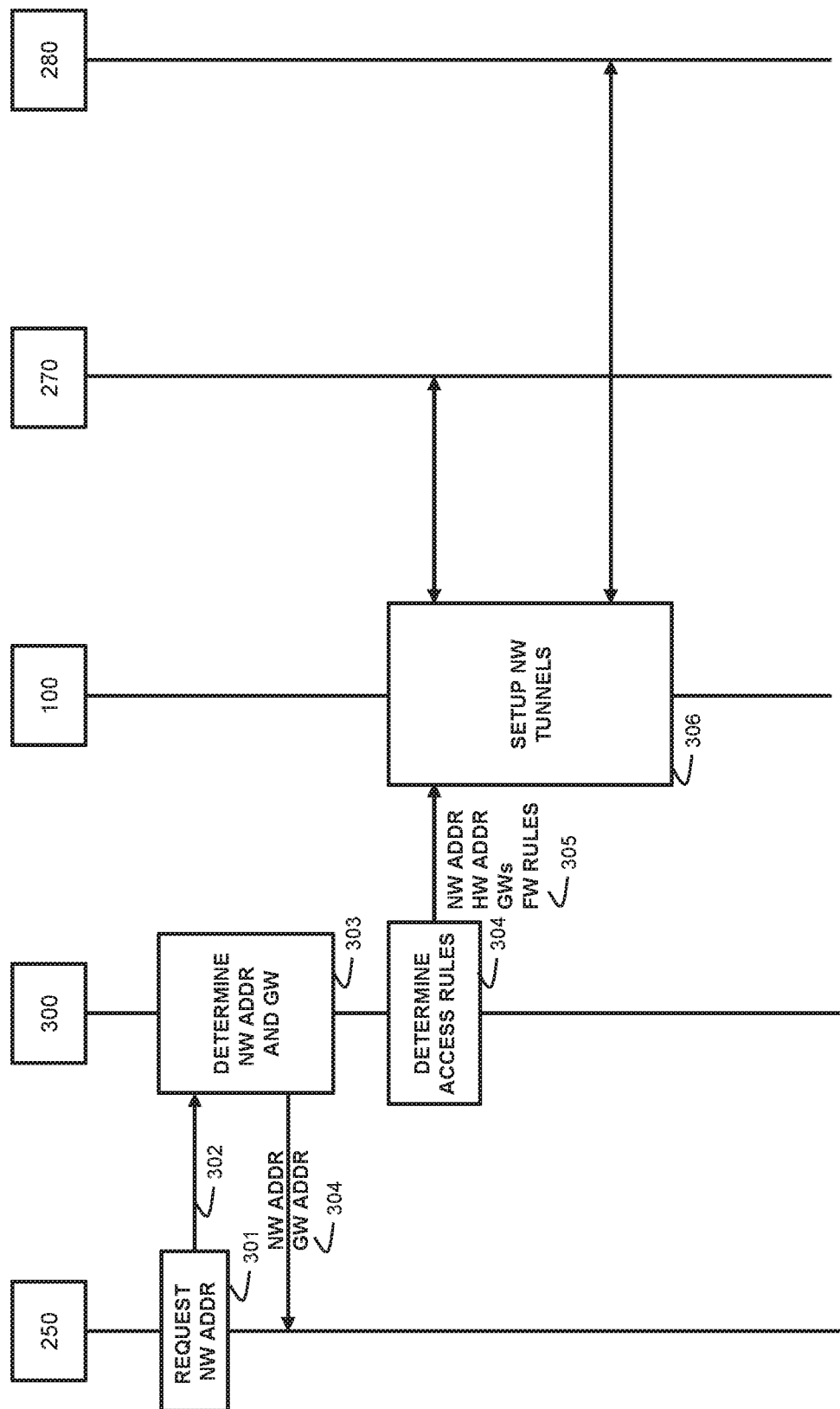
FIG. 3 shows a sequence diagram for establishing networking tunnels in a secured communication network according to an example embodiment.

FIG. 3 shows a sequence diagram for adding networking device 250 to network segments 271 and 281. In a first step 301, communication device 250 connects to the local network 201 and requests a network address (e.g., by a broadcast message onto the local network 201). The request 302 is received by an authentication service 300 that is accessible from the local network 201. Based on the request the authentication service 300 determines in step 303 a network address and an address of a default gateway for the networking device. The default gateway serves as the networking device for communicating outside local network 201 (e.g., the default gateway corresponds to access controller 100). Thereupon, the network address of the communication device 250 and of the access controller 100 is sent as a return packet 304 to communication device 250.

Upon the request 302, authentication service 300 also determines access rules for the communication device 250 under step 304. The access rules comprise the identification of communication device 250 (e.g., the hardware and network address of communication device 250) and access information on how to connect to network segments 271, 281. This access information may for example comprise a network address of the remote gateways 270, 280, authentication information for setting up the respective tunnels 120, 122, encryption information for encrypting the networking packets exchanged over the respective tunnels 120, 122 and firewalls rules to apply at the respective gateways 270, 280. Thereupon, the access rules 305 are provided to the access controller 100. Upon receiving the access rules 305, access controller 100 establishes the networking tunnels 120, 122 in a next step 306.

Figure 4:
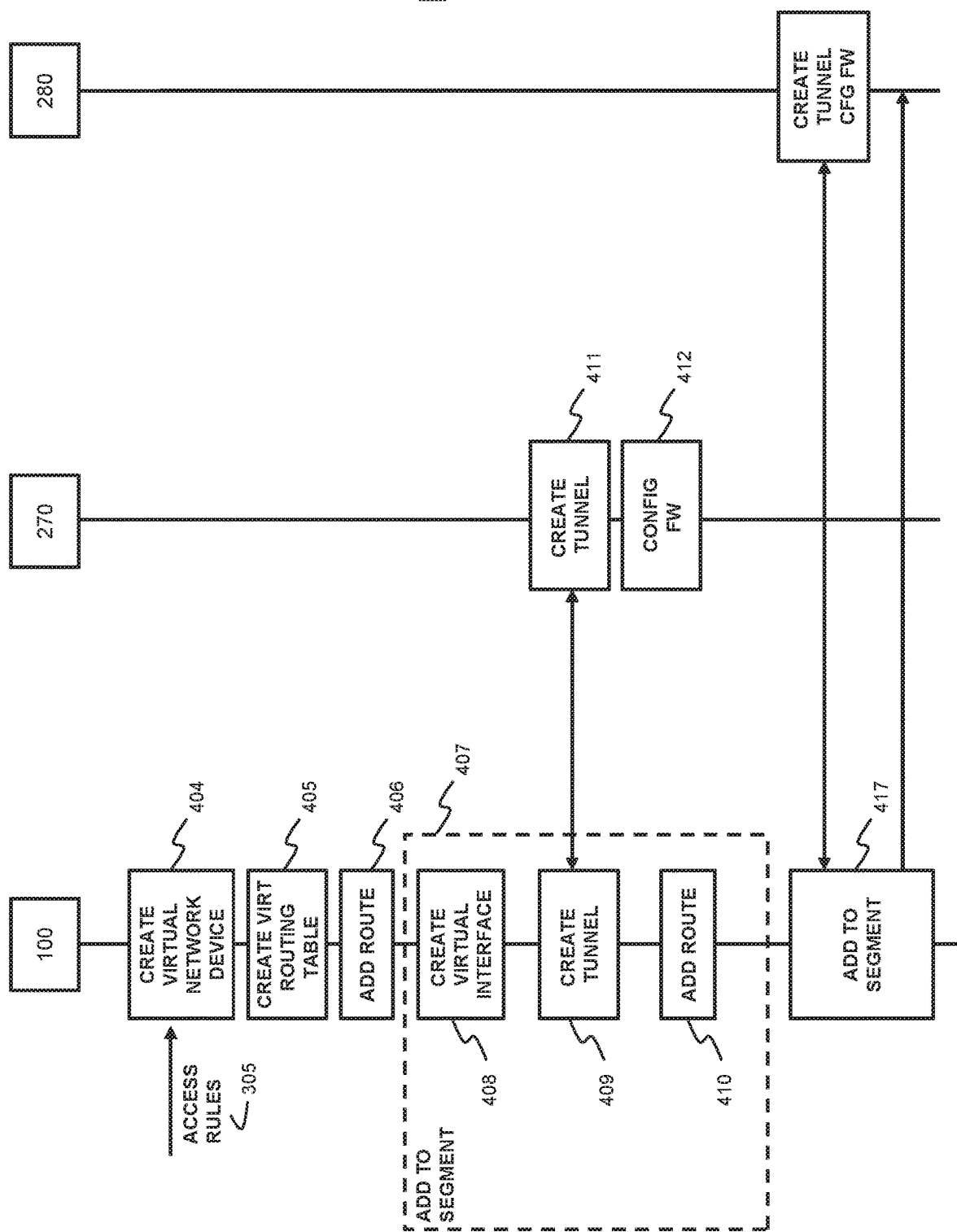
FIG. 4 shows a sequence diagram for establishing networking tunnels in a secured communication network according to a further example embodiment.

FIG. 4 illustrates steps performed by access controller 100 for setting up the networking tunnels 120, 122 under step 306 of FIG. 3 according to a further embodiment. In a first step 404, access controller 100 receives the access rules from authentication service 300. As no networking tunnels are established yet for communication device 250, access controller 100 first creates a virtual networking device 117 with a dedicated networking interface 115 for communication device 250. In one example, the virtual networking device 117 is implemented by creating a network container (e.g., an operating-system-level virtualized instance running a separate networking stack). Such operating-system-level virtualization, also referred to as containerization, is for example provided by the Docker software and available for Linux, Windows and macOS based operating systems. Alternatively, access controller 100 may also instantiate a virtual machine (e.g., an emulated computer system) associated with the communication device 250 with its own communication interface. Upon creating the virtual device 117, a virtual routing table is also created for the virtual networking interface 115 according to step 405. Thereupon, in step 406, access controller 100 adds a source based routing rule for communication device 250 to its routing table (e.g., packets received from the communication device 250 are routed towards the virtual networking device 117 and, hence, to virtual networking interface 115).

When the virtual networking interface 115 is established, the access controller establishes the networking tunnels as identified by the received access rules. The establishment of networking tunnel 120 with network segment 271 is illustrated by steps 408 to 410 and identified together as step 407. In a first step 408, virtual device 117 and, hence, access controller 100 creates the first virtual networking interface 111 within the virtual device 117. Thereupon, in step 409, the networking tunnel 120 is created with gateway 270. According to step 411, gateway 270 on its turn creates a networking interface 272 for communication between devices in network segment 271 and communication device 250 and announces the device within network segment 271, hence making communication device 250 part of network segment 271. Upon creation of the networking tunnel 120, access controller 100 adds a destination based route in the virtual routing table to route networking packets received on interface 115 with a network address within network segment 271 to networking tunnel 120. After setup of the networking tunnel 120, there is a dedicated network route between communication device 250 and network segment 271. Without further configuration, communication device 250 is part of network segment 271 and may thus communicate with any device within network segment 271. To further secure communication within network segment 271, the access rules 305 may further comprise firewall rules for gateway 270 (e.g., for further restricting network access of packets exchanged over interface 272 and, hence, between communication device 250 and the other communication devices within network segment 271). These rules may be communicated by access controller 100 to gateway 270 which on its turn applies the firewall rules in step 412.

Thereupon, access controller 100 repeats the tunnel setup step 407 as step 417 to create networking tunnel 122 between interface 112 and gateway 280, thereby adding communication device 250 to network segment 281.

Local network 201 may comprise more than one access controller, for example a second access controller 200 may be added to network 201 for providing further network access to communication devices 252 and 253. In such a case, both access controllers 100 and 200 may serve as gateways to any of the network segments 271, 281, 291. This allows load balancing network traffic from the network segments over different gateways in a linear fashion because the gateways can operate simultaneously. Moreover, access control of a networking device within local network 201 may be transferred from one access controller to another access controller as described further below. To this respect, all access controllers within local network 201 have the same network address such that load balancing between networking devices appears transparent to the networking devices.

Figure 5:
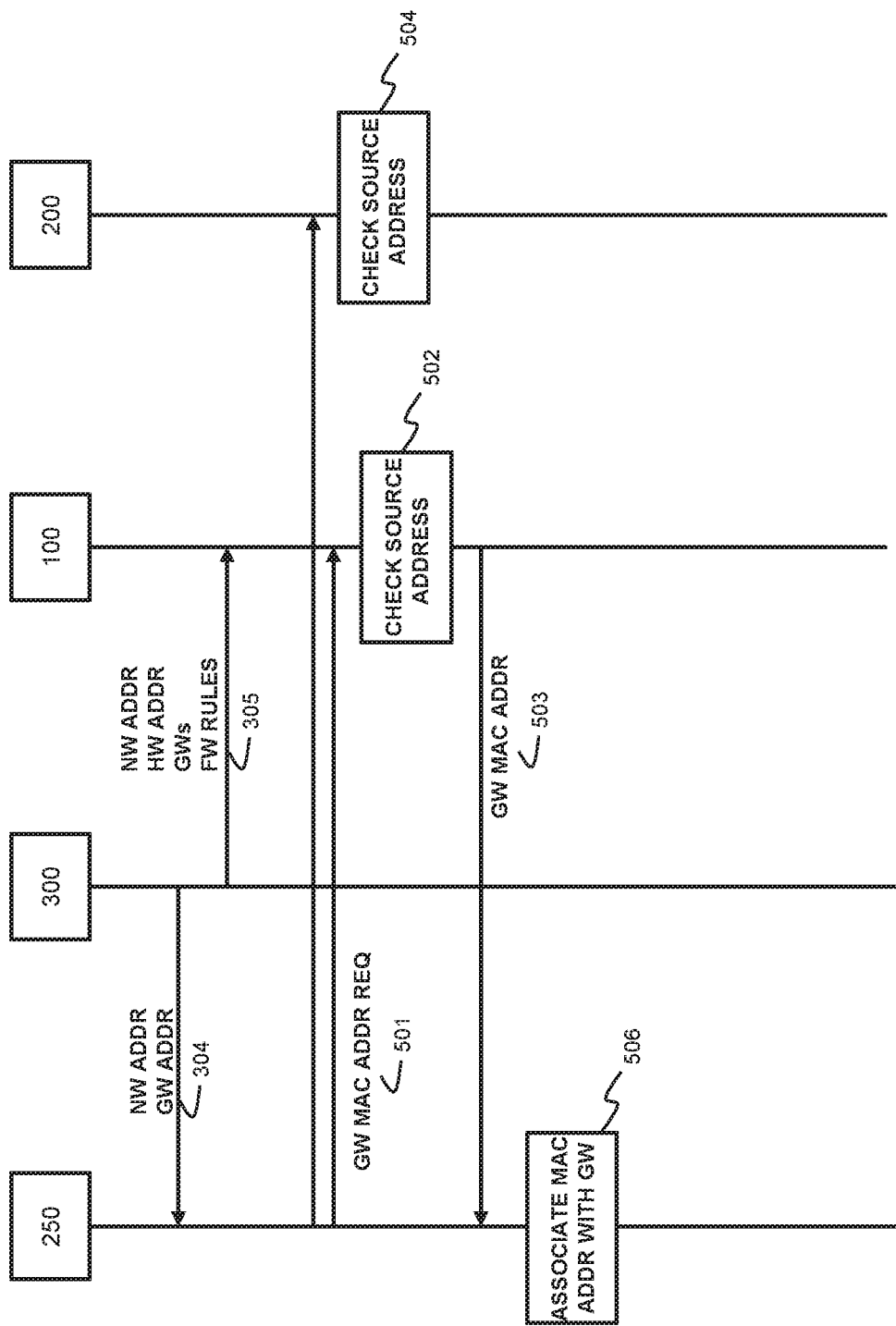
FIG. 5 shows a sequence diagram for providing hardware address of a default gateway to a networking device according to an example embodiment.

FIG. 5 illustrates the assigning of the access controller 100 as default gateway to communication device 250 in the scenario where there are two access controllers 100 and 200 with the same network address. Following the steps as illustrated by FIG. 3, the networking device 250 receives a network address and default gateway address from authentication service 300. In parallel, authentication service 300 assigns one of the access controllers by providing the access rules 305 to access controller 100. When the communication device 250 receives the network address of the default gateway, it sends out a broadcast message onto the local network 201 which is received by both access controller 100 and 200. Even though the access controller 200 has the network address as provided in the broadcast message 501, it refrains from responding to the request because it does not have appropriate access rules for communication device 250. To verify this, access controller 200 verifies under step 504 the source networking or hardware address of the broadcast message 501 and compares it with the communication devices for which it has received access rules (e.g., that of communication devices 252 and 253). As the addresses of these communication devices do not match with that of the broadcast message 501, access controller 200 refrains from responding.

In a similar fashion, broadcast message 501 is received by access controller 100. Upon verification of the source address under step 502, access controller 100 matches the source address of the broadcast message 501 with the network or hardware address as specified in the received access rules 305. Thereupon, access controller 100 sends a response 503 to communication device 250 with its hardware address. Based on the response 503, communication device 250 associates the network address of the default gateway with the hardware address of access controller 100. As a result, communication device 250 will address all communication outside the local network 201 to access controller 100. The steps of FIG. 5 may be performed in a similar fashion for all communication devices 250-253 within the local network 201. This way, each communication device is assigned to one of the access controllers.

Figure 6:
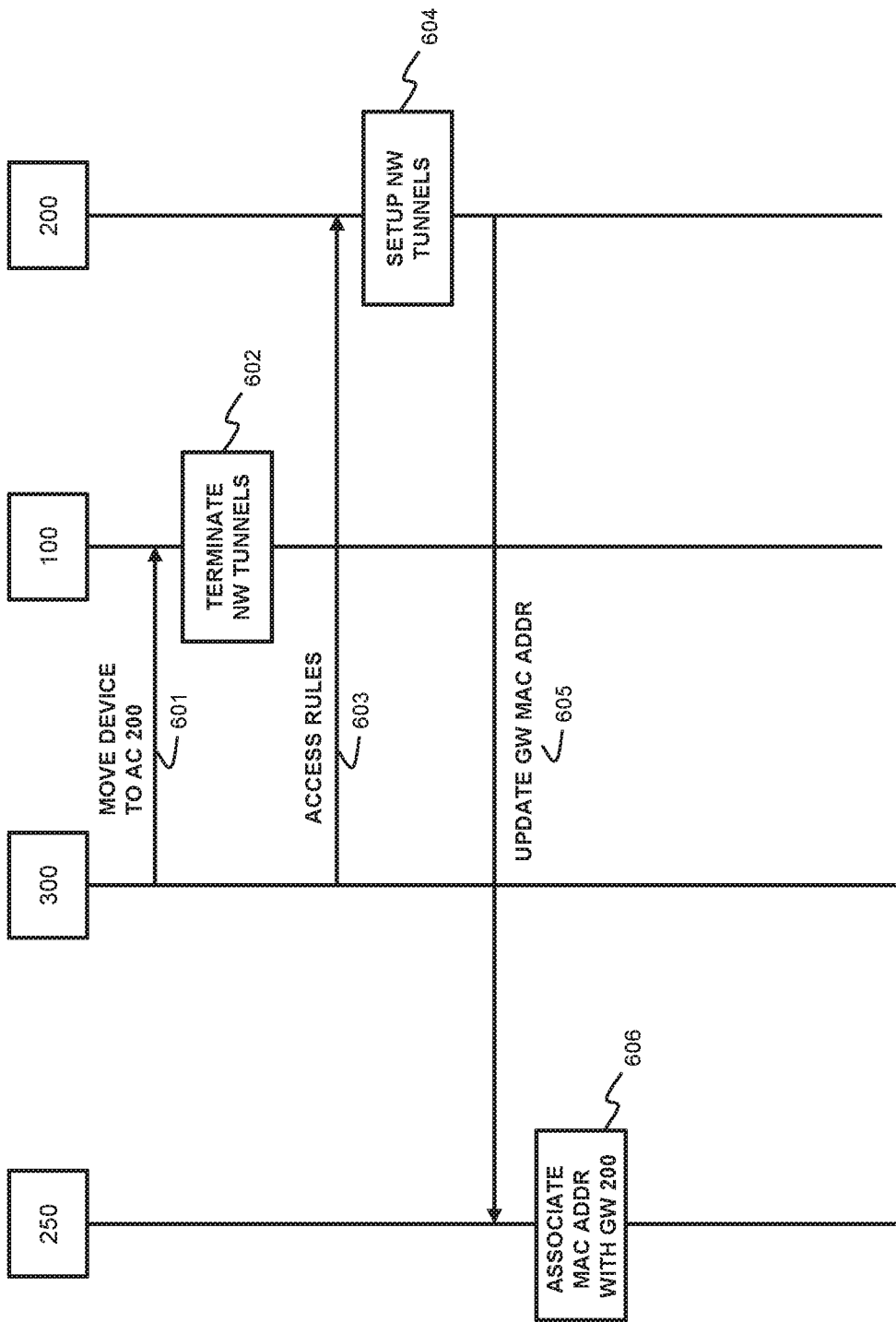
FIG. 6 shows a sequence diagram for providing a networking device with a different default gateway according to an example embodiment.

When the local network 201 comprises more than one access controller 100, 200, the access control may be transferred from one access controller to another access controller. This may for example be done in case of failure or overload of one of the access controllers. FIG. 6 illustrates steps for performing a transfer of communication device 250 from access controller 100 to access controller 200. In a first step, the authentication service 300 sends an instruction 601 to access controller 100 to terminate the access control for communication device 250. Thereupon, in step 602, access controller 100 terminates the dedicated networking tunnels 120, 122 with the respective remote gateways 270 and 280. To this end, access controller 100 may delete the virtual networking device 117 (e.g., delete the networking container) and remove the route towards the interface 115 as established under step 406 from its routing table. When the transfer of the access control is due to a failure of access controller 100, these steps 601 and 602 may be obsolete. Then, authentication service 300 provides the access rules 603 to the other access controller 200. These access rules may further correspond to the access rules 305 as provided before to access controller 100. With these access rules 603, access controller 200 re-establishes the networking tunnels 120, 122 with the respective remote gateways 270 and 280 under step 604. The setup of these tunnels may be performed by the steps as described with reference to FIG. 4. At that moment, communication device 250 still has the network address of its default gateway associated with the hardware address of access controller 100. To this purpose, access controller 200 sends a packet 605 to communication device 250 announcing that the hardware address for the default gateway's network address is that of access controller 200. The packet 605 may further correspond exactly with the packet 503 except for the specified hardware address. As an address resolution protocol is typically stateless, the communication device 250 will thereupon update, in step 606, the association of the default gateway's network address with the hardware address of access controller 200 in its address table. From that moment onwards, communication device 250 will direct its traffic to access controller 200 which serves as its default gateway.

Figure 7:
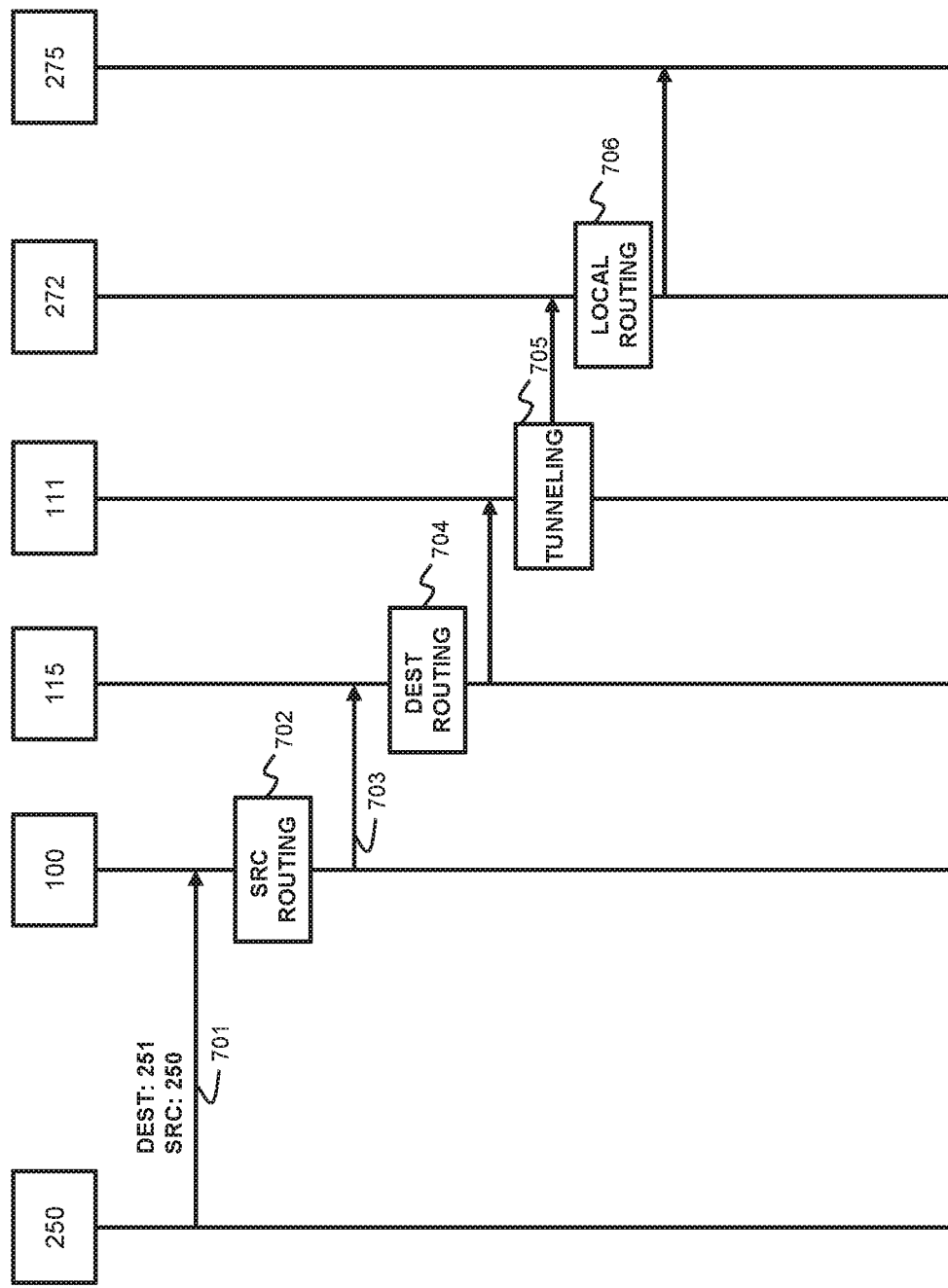
FIG. 7 shows a sequence diagram for forwarding a networking packet from a source communication device to a destination communication device.

FIG. 7 illustrates the forwarding of a network packet 701 transmitted by networking device 250 to networking device 275 which is part of the network segment 271. As a first step, device 250 creates a networking packet 701 with the network address of device 275 as a destination address. As the destination address is outside the local network 201, device 250 forwards the packet to the access controller 100. Access controller 100 then forwards the packet to its virtual networking interface 115 by looking up the source address in its routing table (e.g., based on source based routing 702). Within the virtual network container, the received packet 703 is forwarded under step 704 to the virtual interface 111 based on the destination network address. Upon reception at the virtual interface, the network packet is encapsulated 705 and forwarded over tunnel 120 to the virtual interface 272 of gateway 270. The gateway 270 on its turn then forwards the packet to its destination 275 by local routing.

Figure 8:
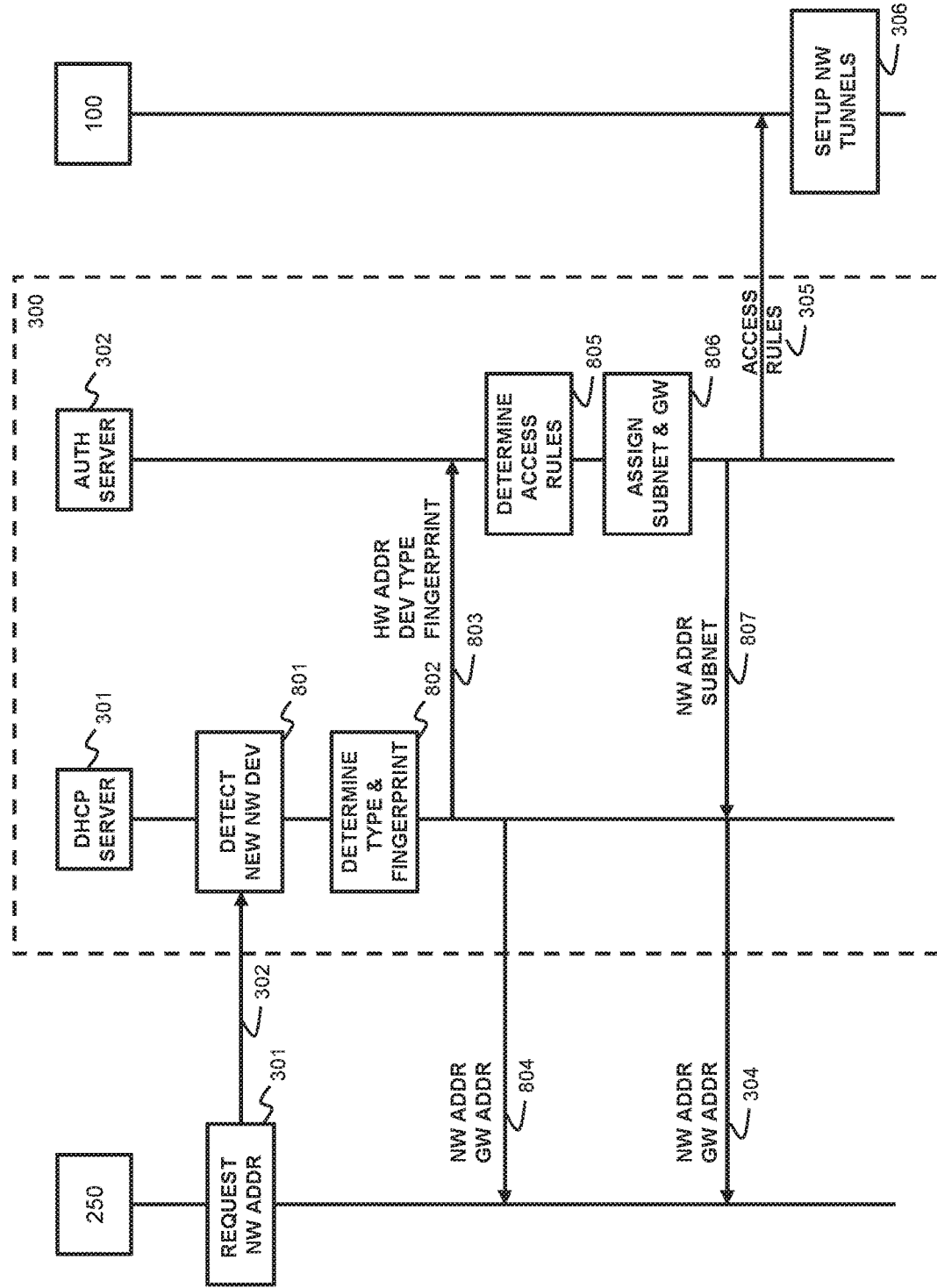
FIG. 8 shows a sequence diagram for determining access rules by a host configuration component and an authentication component according to an embodiment.

FIG. 8 illustrates steps performed by authentication service 300 according to a further embodiment. Authentication service 300 may comprise a host configuration component 301, for determining a network address and default gateway address of the communication device 250. The configuration component may for example interoperate with communication device 250 according to the Dynamic Host Configuration Protocol, DHCP, as specified under RFC 2131. Authentication service 300 may further comprise an authentication component 302 for deriving the access rules 305. The host configuration component 301 may be implemented as a DHCP server 301 as part of network segment 201. The authentication component 302 may be implemented locally or remotely as an authentication server 302. The authentication server may, for example, correspond to a cloud service that is responsible for authentication of networking within a single-site or multi-site corporate communication network.

Upon receipt of the network address request 302 from networking device 250, the DHCP server 301 detects (801) that a new communication device has connected to the local network 201. At that moment, communication device has at most access to the other devices within the local communication network. Other devices are only accessible by the access controllers 100, 200. Based on the request 302, DHCP server 301 may derive different properties of the requesting networking device 250. DHCP server 301 may for example derive the type or class of the networking device 250 based on the hardware address provided by the request 302. As this hardware address is unique for the device, information on the vendor or device type may be available. For example, for a MAC addresses according to the IEEE 802 protocol, vendor and device type information may be derived from the MAC address. Further information about the communication device may be derived by determining (802) a fingerprint from the information exchange with the networking device 250. As the request 302 may comprise DHCP options such as for example DNS Server, WINS server, default gateway, etc., the order in which the DHCP client asks for those options is relatively unique and identifies the specific operating system version. The same principle applies to DHCPv6 where those options are also asked in a specific order and an enterprise identifier is submitted in the request 302. This unique identification may further be submitted to a fingerbank (e.g., an online service that identifies a certain networking device based on its fingerprint). DHCP server 301 then forwards this information 803 to authentication server 302 that determines (805) the access rules based on this information. By these access rules, authentication service 302 may also select a network segment and default gateway for communication device 250. Thereupon, the authentication server supplies the access rules 305 to access controller 100 for further establishment (306) of the networking tunnels 120, 122.

DHCP server 301 may further directly assign the default gateway address and network address (804) to networking device 250. Alternatively, DHCP server 301 may supply the network address and gateway address 304 based on information 807 supplied by the authentication server 302. DHCP server 301 may also perform the assignment of the network address in multiple stages wherein, in the first stage, the communication device 250 is provided with a gateway and network address 804 for untrusted devices and, after authentication by the authentication server 302, the communication receives its final networking and gateway address 304.

Figure 9:
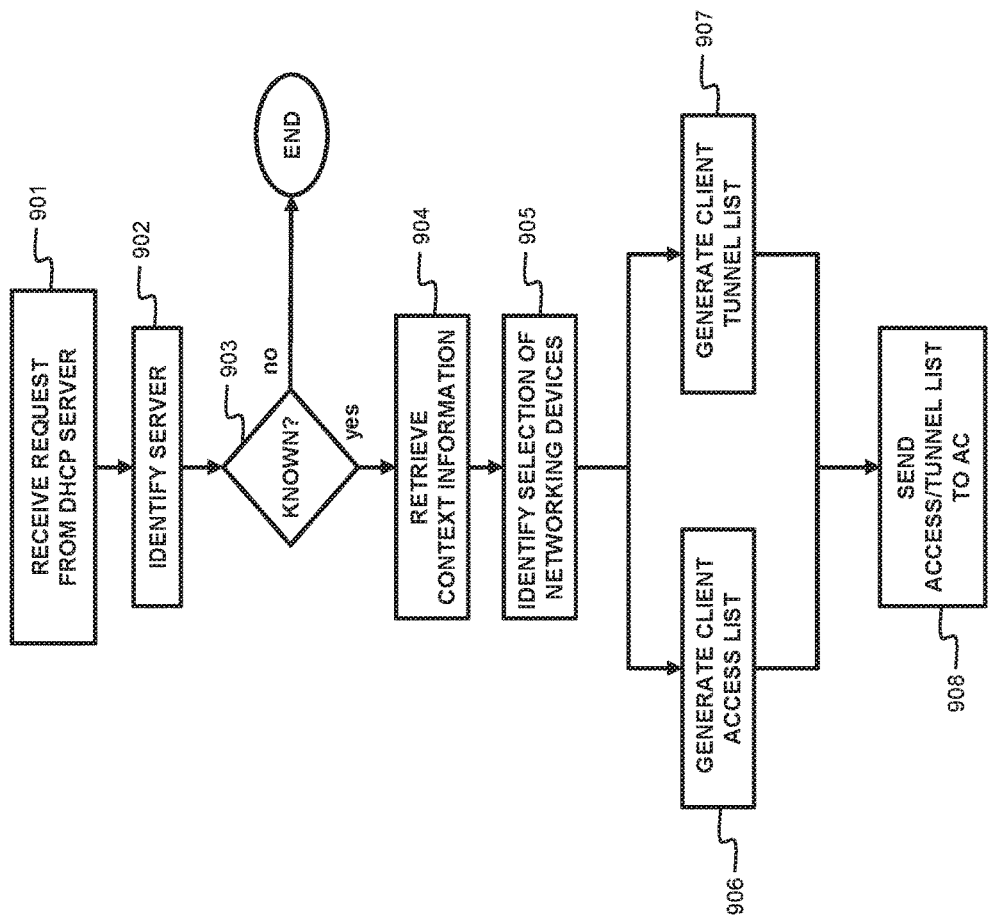
FIG. 9 illustrates steps performed by an authentication component for determining access rules comprising a tunnel list and an access list.

FIG. 9 shows a flow executed by the authentication server 302 according to an embodiment for determining the access rules 305. At a step 901, the authentication server 302 receives the request 803 from the DHCP server 301. Preferably, the request further comprises authentication information of the DHCP server. In that case, authentication server 302 identifies the DHCP server 302 in a next step 902. If the DHCP server is known, the authentication server retrieves under step 904 further context information about the networking device 250 based on the information received with the request 803. The authentication server 302 then identifies under step 905 a selection of the network segments to which the networking device 250 is allowed network access and, optionally, a selection of networking devices within the network segment with which the networking device 250 is allowed to communicate. Thereupon, authentication server generates an access list under step 906 and a tunnel list under step 907.

The tunnel list comprises all information for the access controller 100 to establish the respective tunnels 120, 122. The tunnel list may comprise network address information such as the destination IP address and/or destination port number of the remote gateways 270, 280. This way, access controller 100 can initiate the establishment of the respective tunnel 120, 122 by requesting the setup of a tunnel at the IP address and port number as specified in the tunnel list. The tunnel list may further comprise tunnel authentication information in order to authenticate the access controller 100 with the remote gateway 270, 280. The tunnel authentication information may further be dynamic (e.g., not known by the remote gateways 270, 280). In this case, the authentication server 301 may forward the tunnel authentication information to the remote gateways 270, 280.

The access list identifies a selection of the networking devices within the respective segments with which the communication device is allowed to communicate. According to one embodiment, the access list comprises firewall rules for the remote gateways 270, 280. The access list is further supplied by the access controller 100 to the respective gateways 270, 280 which, on their turn, apply the included firewall rules on the respective interfaces 272, 282 with the access controller 100. The access list may further comprise conditions to the addressing information of the networking devices within the network segments 271, 281. An illustrative example of an access list is show in the table below.

TABLE 1

Client access list with conditional application servers

| IP Address | Condition |
|---|---|
| 10.0.0.1 | TimeInterval(09.00-17.00) |
| 10.0.0.3 | StringPrefix(username, "adm_") |

The first column specifies the network address of the networking device to which the networking device 250 is granted network access to. The second column further specifies a condition that needs to be fulfilled in order to have the access. The first condition specifies a specific time interval during which the client is granted access to the networking device 10.0.0.1. The second example could be used to identify a specific user or group, in this case the company's administrators, which are the only ones that could be able to access a given networking device.

In a last step 908, the authentication server 302 provides the access list and tunnel list as the access rules to the access controller 100.

Referring back to FIG. 1, by the above described embodiments, a fine-grained network access control is achieved without the need for a translation of the access control onto the network topology. It is sufficient to add the above described access network controller 100 to a local network segment 101. All access beyond the local network segment 101 is then defined by the access rules as applied within the access controller 100 and the respective remote gateways of the network segments 171, 181, 191. For example, local network 101 may correspond to a company's private local area network where local packet forwarding is handled by network switch 141. Different types of devices may be connected to this local network such as for example a projector 152, a telephone 153, a printer 154, a wireless access point 160, wireless clients 155, 156, and other networking devices 150.

Without access controller 100, upon connecting a networking device into the local network 101, access control within the network 101 can be enforced by configuring port control on switch 141 (e.g., by configuring Virtual Local Area Networks within switch 141). However, for managing network access of devices within network 101 to other network segments, the same kind of configuration must be applied to all intermediate networking equipment. By the introduction of access controller 100, such kind of network configuration becomes obsolete because the access controller 100 puts each networking device directly within the private network segments 171, 181, 191. Further network security can be achieved by only allowing communication between the networking devices and the access controller 100 and DHCP server 140. This may, for example, be done by a one-time port configuration of networking switch 141 when the access controller is configured within local network 101.

A telephone 153 may, for example, be added to network segment 181, which comprises all telephone equipment. Furthermore, the access list may further limit network access of telephone 153 to only a telephone server 182. In case of a security breach wherein a malicious networking device spoofs the hardware address of telephone 153, the device would only be able to exchange network packets with the telephone server 182, but not with any of the devices within the local network 101 nor with any of the devices within the other network segments 171, 191.

Another network segment 171 may for example be used for trusted computer devices such as laptop of desktop computers 151. Network segment 171 may further allow access by printing server 192 for use by computers 151. Computers 151 may further be restricted to communicate with each other but only with services such as print server 192. A printer 154 is then only admitted to network segment 191 dedicated for printing devices. Also printing server 192 is admitted to this network segment 191 such that printing jobs can be launched from computers 151 to printing server 192 and, thereupon, from printing server 192 to any one of the printers.

Figure 10:
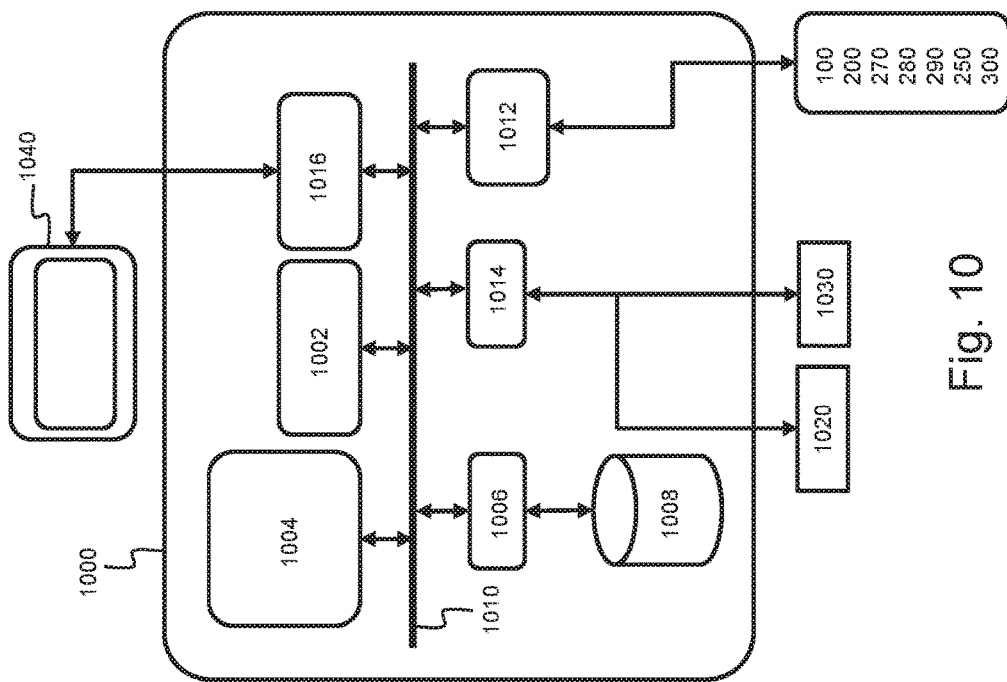
FIG. 10 shows an example embodiment of a suitable computing system for performing one or several steps according to various example embodiments.

FIG. 10 shows a suitable computing system 1000 enabling to implement steps of the methods according to the described embodiments. Computing system 1000 may in general be formed as a suitable general-purpose computer and comprise a bus 1010, a processor 1002, a local memory 1004, one or more optional input interfaces 1014, one or more optional output interfaces 1016, a communication interface 1012, a storage element interface 1006, and one or more storage elements 1008. Bus 1010 may comprise one or more conductors that permit communication among the components of the computing system 1000. Processor 1002 may include any type of conventional processor or microprocessor that interprets and executes programming instructions. Local memory 1004 may include a random-access memory (RAM) or another type of dynamic storage device that stores information and instructions for execution by processor 1002 and/or a read only memory (ROM) or another type of static storage device that stores static information and instructions for use by processor 1002. Input interface 1014 may comprise one or more conventional mechanisms that permit an operator or user to input information to the computing device 1000, such as a keyboard 1020, a mouse 1030, a pen, voice recognition and/or biometric mechanisms, a camera, etc. Output interface 1016 may comprise one or more conventional mechanisms that output information to the operator or user, such as a display 1040, etc. Communication interface 1012 may comprise any transceiver-like mechanism such as for example one or more Ethernet interfaces that enables computing system 1000 to communicate with other devices and/or systems, for example with other computing devices 100, 200, 270, 280, 290, 250, 300. The communication interface 1012 of computing system 1000 may be connected to such another computing system by means of a local area network (LAN) or a wide area network (WAN) such as for example the internet. Storage element interface 1006 may comprise a storage interface such as for example a Serial Advanced Technology Attachment (SATA) interface or a Small Computer System Interface (SCSI) for connecting bus 1010 to one or more storage elements 1008, such as one or more local disks, for example SATA disk drives, and control the reading and writing of data to and/or from these storage elements 1008. Although the storage element(s) 1008 above is/are described as a local disk, in general any other suitable computer-readable media such as a removable magnetic disk, optical storage media such as a CD or DVD (e.g., CD-ROM or DVD-ROM) disk, solid state drives, flash memory cards, etc., could be used. Computing system 1000 could thus correspond to any one of the devices 100, 200, 251-253, 270, 280, 290, 300, 301, 302.

Various additional embodiments regarding provisioning access for devices connecting to a network are now described below.

Access Controller Operation

Existing network approaches for provisioning network access for a networking device (e.g., a user device, such as a mobile device) require that dedicated software run on the user device. In various cases, for example, provisioning network access requires that the user device itself create one or more tunnels from the user device to different destinations (in many cases through multiple intermediary devices), collect metadata associated with a context of the request for network access, build network connectivity for the network access, and/or update a routing table maintained by the user device. In one example, the routing table is updated based on access rules for the user device. In one example, the user device needs to obtain the access rules from a different computing device.

The foregoing causes the technical problems of increased complexity and difficulty in connecting user devices to a network. For example, for Internet of things (IoT) and other devices (e.g., a camera, printer, or scanner), it is desirable that the IoT device is able to request and automatically obtain network access without requiring that dedicated software be resident on the device itself.

In addition, regarding the use of tunnels, when there are multiple devices (e.g., two or more user devices) each seeking network access, it is desirable to implement load-balancing because network traffic goes through all of the devices. However, a technical problem with existing approaches is that a user device needs to perform filtering (e.g., using a firewall) of this network traffic. For example, if packets are sent from a third user device, there is no assurance with standard internet routing protocols that return packets will come back to the third device. This significantly limits the scalability of such existing filtering approaches.

One or more embodiments described below provide a technological solution to one or more of the above technical problems. In one embodiment, a gateway access controller provisions access for a new device (e.g., networking device 250) seeking network access. The access controller determines a context of a request for network access that is received from the device, and makes connections for the device to various locations (e.g., in other networks) based on the context. The network access can be provisioned without any need to install software on the new device. In one example, the access controller will be the next hop for an IoT device seeking network access.

In one embodiment, an access controller builds tunnels and enforces one or more policies based on metadata. In one example, the metadata indicates a context associated with a networking device seeking network access. In one example, classification and/or context data associated with an access request from a new device are determined by an external system (e.g., an authentication server as described above) and sent to the access controller. Optionally, the context data above can include the MAC or other hardware address of the new device.

In one embodiment, the above classification and/or context are used to assign access rules for the new device. The assigned access rules are provided to the access controller that will act as the gateway for the new device. The access controller builds one or more tunnels that are associated with the new device. The tunnels are used for communicating future packets received from the new device. In one example, each tunnel corresponds to a different application that communicates with the new device (e.g., a printing application, a security application, a communication application, etc.).

In one embodiment, device certification and device fingerprinting data for the new device are provided to the access controller for enforcement (e.g., the data can be used to determine access rules for the new device).

Linear Scaling of Network Access

In one embodiment, multiple access controllers are used to establish network access for various types of networking devices. In one embodiment, this provides linear failover (e.g., in case an access controller fails during operation).

In one embodiment, a dedicated set of tunnels is created for each new networking device that seeks network access. Access rules are enforced for each new networking device.

In one embodiment, load balancing is implemented by using the same network address for all access controllers. In one example, when a new device seeks network access, a request for access is received by multiple access controllers. Only that access controller that has a set of tunnels corresponding to the new networking device will respond to the access request. The other access controllers will remain silent (e.g., refrain from responding as discussed above).

In one embodiment, a local network includes two or more access controllers. For example, a second access controller can be added to a network for providing further network access to communication devices in a local network segment. In this case, each access controller can serve as a gateway to other network segments. This allows load balancing network traffic from the network segments over different gateways in a linear fashion because the gateways can operate simultaneously. Moreover, access control of a networking device within a local network may be transferred from one access controller to another access controller as described further herein. All access controllers within the local network can have the same network address such that load balancing between networking devices appears transparent to the networking devices.

Source-Based Destination Routing

In one embodiment, an access request is received from a user device. A routing table look-up is performed based on the source IP of the user device (e.g., the source address of a new IoT device). The routing table identifies the virtual device (e.g., a first virtual interface of several virtual interfaces of an access controller) to receive packets from the user device. Once the virtual device is identified, the proper hardware destination for packets from the user device can be identified from the routing table.

In one embodiment, the routing table is stored in the next hop gateway (e.g., an access controller), and the routing table identifies an existing tunnel that corresponds to the destination for packets received from the user device.

In one embodiment, another user device sends packets to an access controller. The other user device has a different source IP address. In this case, the look-up result from the routing table will be different because the packets come from a different source. Thus, based on this look-up result, a different virtual device of the access controller is identified for receiving all of the packets from the other user device.

In one embodiment, a method comprises: receiving, by an access controller, a network packet; determining, by the access controller, a set of networking tunnels to which the network packet is to be forwarded based on a source address of the network packet; selecting, by the access controller, a first networking tunnel of the set of networking tunnels based on a destination address of the network packet; and routing, by the access controller, the network packet to the first networking tunnel.

In one embodiment, the method further comprises adding a destination-based route in a routing table to route networking packets received with the destination address to the first networking tunnel.

In one embodiment, the network packet is received from a computing device (e.g., networking device 250), and the method further comprises adding a source-based route to the routing table. Packets from the computing device are routed to a virtual interface that corresponds to the set of networking tunnels.

Establishing Tunnels in Response to Network Access Request

In one embodiment, one or more tunnels are established in response to receiving a request for network access from a networking device (e.g., networking device 250).

In one embodiment, a method comprises: providing, by an access controller (e.g., access controller 100), one or more dedicated networking tunnels between the access controller and respective remote gateways; routing, by the access controller, networking packets from a networking device to the one or more dedicated networking tunnels based on source address information in each respective networking packet; and routing, by the access controller, the networking packets to a selection of the one or more dedicated networking tunnels based on destination address information in the respective networking packet.

In one embodiment, the method further comprises receiving, by the access controller, access rules for the networking device. The networking device is authorized by the access rules to access one or more network segments.

As used in this application, the term "circuitry" may refer to one or more or all of the following:

(a) hardware-only circuit implementations such as implementations in only analog and/or digital circuitry and (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular networking device, or other computing or networking device.

Although the present disclosure has been illustrated by reference to specific embodiments, it will be apparent to those skilled in the art that the disclosure is not limited to the details of the foregoing illustrative embodiments, and that the present disclosure may be embodied with various changes and modifications without departing from the scope thereof. The present embodiments are therefore to be considered in all respects as illustrative and not restrictive, the scope of the disclosure being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the disclosure are capable of operating according to the present disclosure in other sequences, or in orientations different from the one(s) described or illustrated above.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The invention claimed is:

1. A method comprising:
  sending, to a first access controller, an instruction to terminate access control for a networking device, wherein the first access controller serves as a default gateway for the networking device, and in response to receiving the instruction, the first access controller terminates a networking tunnel to a remote gateway; and
  sending, to a second access controller, access rules for the networking device, wherein the second access controller, in response to receiving the access rules:
    re-establishes the networking tunnel to the remote gateway; and
    sends a packet to the networking device announcing that the second access controller will serve as the default gateway for the networking device.

2. The method of claim 1, further comprising, prior to sending the instruction, sending the access rules to the first access controller.

3. The method of claim 2, wherein the access rules authorize access by the networking device to a network segment via the remote gateway.

4. The method of claim 1, further comprising:
  detecting that the networking device has connected to a local network;
  in response to detecting that the networking device has connected to the local network, determining at least one property of the networking device;
  prior to sending the instruction, determining, based on the at least one property, the access rules; and
  sending the access rules to the first access controller.

5. The method of claim 4, further comprising selecting, based on the access rules, the first access controller as the default gateway for the networking device.

6. The method of claim 5, wherein, prior to sending the instruction, the first access controller uses the access rules for establishing the networking tunnel.

7. The method of claim 1, wherein the first access controller and the second access controller each use a same network address.

8. The method of claim 7, wherein the second access controller:
receives a broadcast message sent by the networking device to the first access controller and the second access controller;
compares an address of the broadcast message with networking devices for which the second access controller has received access rules; and
in response to determining that the address does not match the networking devices for which the second access controller has received access rules, refrains from responding to the broadcast message.

9. The method of claim 8, wherein the first access controller:
matches the address of the broadcast message with access rules received by the first access controller; and
in response to matching the address of the broadcast message with the access rules received by the first access controller, sending a response to the networking device that includes a hardware address of the first access controller.

10. The method of claim 1, further comprising sending a default gateway address to the networking device, wherein the default gateway address corresponds to the first access controller.

11. A system comprising:
at least one processor; and
at least one memory containing instructions configured to instruct the at least one processor to:
receive, by a first access controller, an instruction to terminate access by a networking device via a networking tunnel to a remote gateway;
in response to receiving the instruction, terminate, by the first access controller, the networking tunnel;
receive, by a second access controller, access rules for the networking device; and
in response to the receiving the access rules:
re-establish, by the second access controller, the networking tunnel to the remote gateway; and
announce, by the second access controller, to the networking device that the second access controller will serve as a default gateway for the networking device.

12. The system of claim 11, wherein the instructions are further configured to instruct the at least one processor to:
determine at least one property of the networking device; and
prior to receiving the instruction, determine, based on the at least one property, the access rules.

13. The system of claim 11, wherein the instructions are further configured to instruct the at least one processor to:
match the address of a broadcast message with access rules associated with the first access controller; and
in response to matching the address of the broadcast message with the access rules associated with the first access controller, send a response to the networking device that includes a hardware address of the first access controller.

14. The system of claim 11, wherein the instructions are further configured to instruct the at least one processor to:
receive, by each of the first access controller and the second access controller, a broadcast message sent by the networking device;
compare an address of the broadcast message with networking devices for which the second access controller has received access rules; and
in response to determining that the address does not match the networking devices for which the second access controller has received access rules, refrain, by the second access controller, from responding to the broadcast message.

15. The system of claim 11, wherein the instructions are further configured to instruct the at least one processor to:
receive, by the first access controller, the access rules;
in response to the first access controller receiving the access rules, create, by the first access controller, a routing table; and
add, by the first access controller, to the routing table, a source-based routing rule for the networking device, and a destination-based routing rule for the networking device, wherein the destination-based routing rule routes packets to the networking tunnel.

16. A system comprising:
a first access controller configured to:
receive an instruction to terminate access control for a networking device, wherein the first access controller serves as a default gateway for the networking device; and
in response to receiving the instruction, terminate a first networking tunnel to a remote gateway; and
a second access controller configured to:
receive access rules for the networking device; and
in response to receiving the access rules:
establish a second networking tunnel to the remote gateway; and
announce to the networking device that the second access controller will serve as the default gateway for the networking device.

17. The system of claim 16, wherein the second networking tunnel is the first networking tunnel.

18. The system of claim 16, wherein the first access controller is further configured to:
receive the access rules;
in response to receiving the access rules, create a routing table; and
add, to the routing table, a destination-based routing rule for the networking device, wherein the destination-based routing rule routes packets to the first networking tunnel.

19. The system of claim 18, wherein the second access controller is further configured to:
receive a broadcast message sent by the networking device;
compare an address of the broadcast message with networking devices for which the second access controller has received access rules; and
in response to determining that the address does not match the networking devices for which the second access controller has received access rules, refrain from responding to the broadcast message.

20. The system of claim 16, wherein the second access controller is further configured to:

prior to establishing the second networking tunnel to the remote gateway, create a virtual network device with a dedicated networking interface for the networking device.

* * * * *